United States Patent [19]

Bartylla

[11] Patent Number: 4,673,080
[45] Date of Patent: Jun. 16, 1987

[54] ARTICLE TRANSPORT ELEVATOR

[75] Inventor: James G. Bartylla, Morgan Hill, Calif.

[73] Assignee: Raymond Production Systems Corporation, Hollister, Calif.

[21] Appl. No.: 873,496

[22] Filed: Jun. 12, 1986

[51] Int. Cl.⁴ .............................................. B65G 17/46
[52] U.S. Cl. .................................... 198/689.1; 406/78
[58] Field of Search ..................... 198/689.1, 605, 607; 406/78, 82, 86, 88

[56] References Cited

U.S. PATENT DOCUMENTS

| | | | |
|---|---|---|---|
| 3,042,454 | 7/1962 | Eissmann et al. | 406/78 X |
| 3,105,720 | 10/1963 | Barker | 406/88 |
| 3,160,443 | 10/1962 | Harris et al. | 406/86 X |
| 3,502,195 | 3/1970 | Benner | 198/689.1 X |
| 3,722,665 | 3/1973 | Probasco | 198/689.1 |
| 3,854,567 | 12/1974 | Poupin et al. | 198/689.1 X |
| 4,010,981 | 3/1977 | Hodge | 406/88 |
| 4,406,359 | 9/1983 | Cole | 198/689.1 X |
| 4,451,182 | 5/1984 | Lenhart | 406/86 |
| 4,521,130 | 6/1985 | Lenhart | 406/86 |

Primary Examiner—Joseph E. Valenza
Assistant Examiner—D. Glenn Dayoan
Attorney, Agent, or Firm—Malcolm B. Wittenberg

[57] ABSTRACT

Apparatus for transporting articles, such as cylindrical containers, between differing elevations by initially moving the articles on an upper surface of a first plenum by air pressure. The articles are then transferred to a moving belt supported on an upper surface of a second plenum and held on said belt by vacuum. A transfer means is provided at the overlap of the first and second plenums to enhance the transfer of the articles between plenum sections.

11 Claims, 4 Drawing Figures

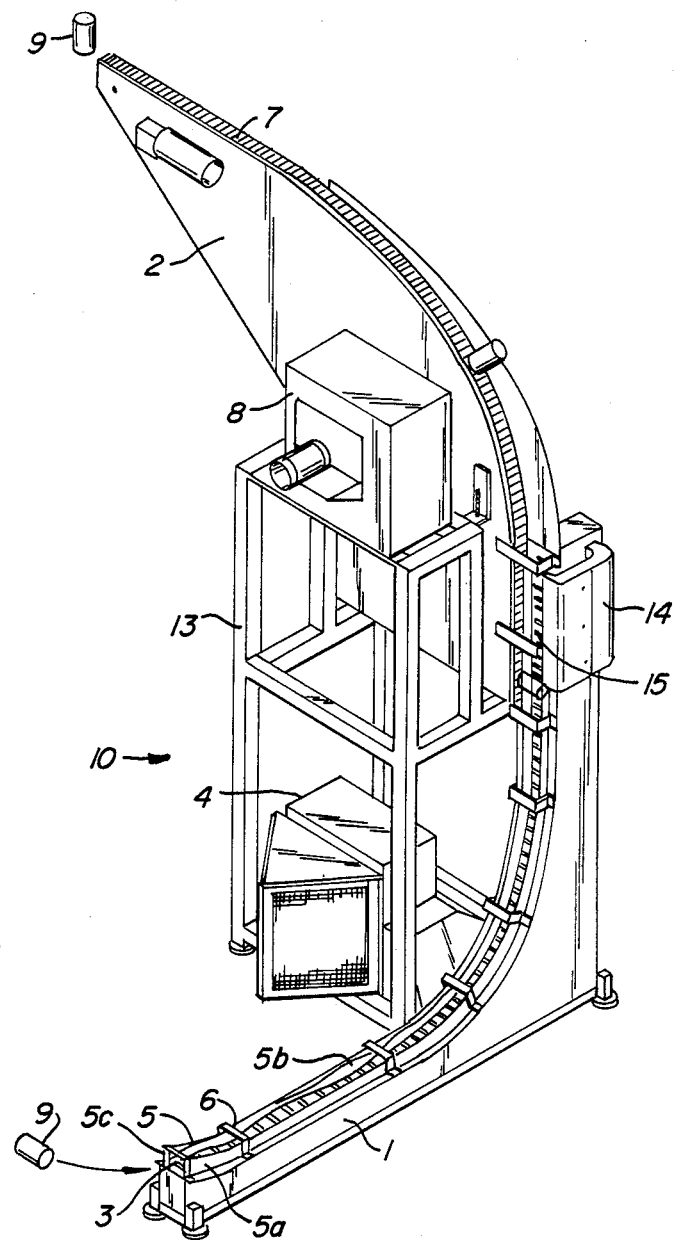
FIG._1.

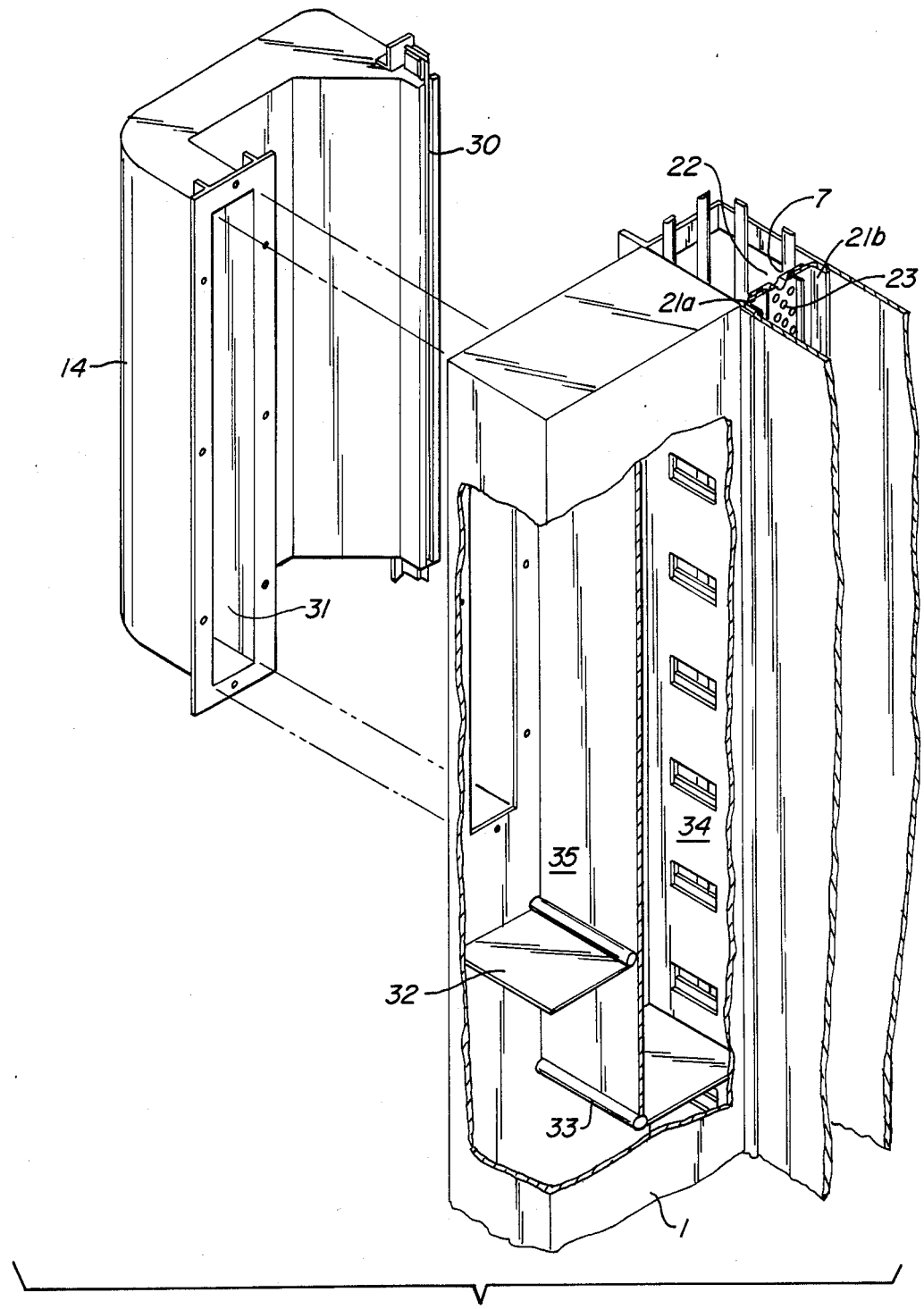
FIG._2.

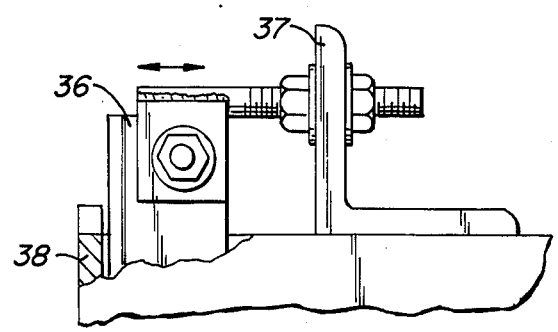
FIG._3A.
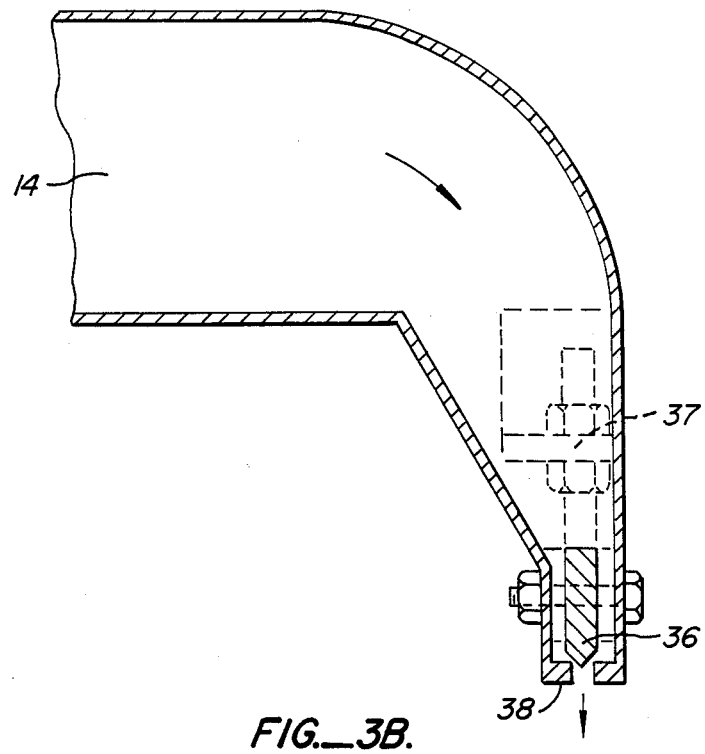
FIG._3B.

4,673,080

ARTICLE TRANSPORT ELEVATOR

TECHNICAL FIELD OF THE INVENTION

The present invention relates generally to the mass transport of articles, such as cylindrical containers, from a first elevation to a second elevation. Preferably, the apparatus of the present invention is intended to receive a cylindrical container which is closed at one end in a horizontal, rolling orientation and elevate the article at a discharge elevation in a vertical orientation.

BACKGROUND OF THE INVENTION

In many manufacturing operations, and particularly in the manufacture of cylindrical containers such as two-piece ferrous or aluminum cans, it is necessary to mass transport such articles, either in single file or en masse. Such containers are characteristically quite unstable, particularly at present-day line speeds which are capable of handling up to approximately 2500 articles per minute.

It is oftentimes necessary in multi-level installations to provide for means of elevating cylindrical or other objects during the processing operation. In view of the fact that when empty, articles such as cans tend to be marginally unstable and easily toppled if not handled with care, mass transport which would include can elevation is difficult to carry out, particularly at high line speeds.

Prior art elevators have characteristically employed either positive air pressure or vacuum-enhanced movable belting. Individually, each approach suffers from certain deficiencies. Although the use of positive air pressure angularly directed toward a rolling cylindrical article is capable of elevating said article rapidly and efficiently, lack of control of the speeding article at the elevator exit can result in damage to the elevated article as well as in a "log jam" as the various articles speed toward the point of transition between the elevator and the next downstream conveyor section.

Vacuum-enhanced movable belts are also not without their drawbacks. When a flexible porous belt is employed over a vacuum or low pressure, excessive belt wear often occurs. Belt failure requires the complete shutdown of the elevator assembly which could cause a complete plant closure and resulting economic loss.

An initial attempt was made to combine air actuation with vacuum belting in order to derive the benefits of each while eliminating their shortcomings. It was believed that by employing air actuation during the early stages of the elevator in order to build transport speed and vacuum-enhanced belting proximate the elevator exit to enhance article control, an improved elevator could be fabricated. As an enhanced benefit, belt wear would be greatly reduced for the belt path could be substantially shortened as the belt would only be required to encompass the vacuum section of the device and not the entire elevator area.

When initial attempts were made to fabricate a composite elevator, it was found that unanticipated problems arose at the transition point between the two elevator sections. Basically, the articles, such as rolling cans, travelling at high rates of speed within the lower or air-actuated section, would resist seating upon the vacuum-enhanced moving belt and would thus tend to fly off the elevator at the point of transition.

It is thus an object of the present invention to provide a single elevator having both air actuated and vacuum-enhanced belting sections which can be employed to gain the benefit of both approaches to article elevation, even at can speeds of 2500 cans per minute or higher.

It is yet a further object of the present invention to provide a composite elevator whereby an article, such as a rolling two-piece can, will progress from a first air-actuated section at a high rate of speed and will be caused to firmly and positively seat upon a vacuum-enhanced moving belt and remain upon the moving belt until discharge from the elevator has been completed.

These and further objects of the present invention will be more readily appreciated when considering the following comments and appended drawings, wherein:

FIG. 1 represents a perspective view of the elevator of the present invention.

FIG. 2 represents a perspective exploded view of the transition section located at the region of overlap between the lower and upper elevator sections.

FIGS. 3A and 3B are cross-sectional segmented views showing the apparatus employed for "fine tuning" the transfer mechanism of FIG. 2.

SUMMARY OF THE INVENTION

The present invention involves a device for transporting a plurality of similarly oriented articles such as cylindrically-shaped containers which are closed on at least one end. The transport of such articles is intended to take place between differing levels and between conveyor systems of a can handling plant.

The elevator of the present invention employs a first plenum having a perforated upper surface. The perforations are oriented to direct air from inside the plenum in the direction of the article transport. Air pressure is provided by a fan or other comparable means in an amount sufficient to at least transport the plurality of similarly-oriented articles from a first or entry level to an intermediate or transfer level.

A second plenum is provided downstream of the first which is provided with an air-permeable upper surface vertically oriented with respect to the first plenum and overlapping the first plenum at the transfer level. Belt means are provided which are supported by and moved over the upper surface of the second plenum. The belt means is perforated to enable low pressure established in the second plenum by a fan or comparable means to be drawn through the belt means in an amount sufficient to secure the transported articles thereon. While the articles are maintained on the belt by virtue of the vacuum drawn within the second plenum, means are provided for moving the belt around the periphery of the second plenum to move the transported articles from the transfer level to the discharge level of the elevator.

To facilitate orderly and secure article transport between the surface of plenum 1 as an air driven section to the rotating belt about plenum 2 as a vacuum-driven device, a transfer means is provided at the overlap of the first and second plenums. The transfer means is provided with a nozzle for directing air against the similarly oriented articles, at least when the articles first contact the belt means in an amount to enhance the securing of the articles onto the belt. Without the transfer means, when line speeds approach the 2000 articles per minute level, the articles would tend to develop excessive momentum, which would prevent their transition from the surface of plenum 1 to the vacuum-enhanced belt of plenum 2. As a result, the articles would discharge from the surface of plenum 1 vertically and tend to leave the surface of the elevator device and become airborne.

DETAILED DESCRIPTION OF THE INVENTION

Elevator 10 of the present invention is shown in perspective in FIG. 1. Frame 13 is shown as structural support for lower plenum 1 and upper plenum 2 which overlap at transfer level 15 proximate the location of the plenum of transfer means 14.

Lower plenum 1 is provided with entry 3 for accepting similarly-oriented articles 9. Article 9, in this illustration, is depicted as the body section of a two-piece can which is fed to entry 3 of plenum 1 in a horizontal, rolling mode. The upper surface of plenum 1 is perforated in such a way as to encourage the passage of article 9 along its surface.

In order to encourage article 9 to retain its entry orientation, which in the embodiment illustrated in FIG. 1 is that of a cylindrical container fed to the elevator in a horizontal and rolling orientation, confinement means is provided. The confinement means 5 comprises a flat sheet metal guide 5a at the open ends of the cans with plastic metal rods 5b, 5c on the bottom and rounded surfaces of the cans. These are held in position by clamps 6.

Centrifugal fan 4 should be of sufficient size to enable articles 9 to pass over the upper surface of plenum 1 at a rate between 1 to 2500 articles per minute. Propulsion is carried out by direct air generated by the centrifugal fan. A centrifugal fan generating from 500 to 3000 cubic feet per minute of air at a pressure from 1 to 6 inches water gauge could be used to practice the present invention.

Vacuum plenum 2 is provided downstream of plenum 1, having an area of overlap 15 along the elevator. Plenum 2 is operated under a vacuum created by centrifugal fan 8. As shown in detail in FIG. 2, the upper surface of plenum 2 is provided with belt means 7 containing perforations 23 travelling between side flanges 21A and 21B, forming channel 22 for belt 7 to circumscribe.

Centrifugal fan 8 having a size range preferably from 10.25 to 16 inches in diameter being attached to a motor, preferably being between approximately 1.5 to 5.0 horsepower, is employed to exhaust approximately 700 to 1600 cubic feet per minute of air from inside plenum 2. This would cause a vacuum from 2 to 12 inches water gauge which would be drawn through openings 23 which preferably are employed at a frequency of approximately 1 to 48 openings per foot, each opening preferably having a cross-sectional area between approximately 0.01231 to 0.3068 inches squared. Such values are illustrative of a vacuum-actuated belt-driven elevator capable of transporting and elevating 1 to 2500 cylindrically-shaped articles vertically resting upon the belt surface with either the closed or open ends abutting said surface to enable the vacuum generated by centrifugal fan 8 to adequately hold the articles in position until proper discharge is carried out.

Transporting the articles along the upper surface of plenum 2 is carried out by driving belt 7 along the periphery of plenum 2 through use of a motor and sprockets (not shown) common to virtually all vacuum-enhanced belt-driven transport devices. As a preferred embodiment, belt 7 can be made to travel at speeds ranging between approximately 200 to 800 feet per minute, employing a drive motor ranging from 0.5 to 1.5 horsepower.

Turning now to FIG. 2, the transfer means can be more readily visualized as well as its function as an integral part of the improved elevator of the present invention. In the embodiment illustrated, air transfer plenum 14 is shown as an add-on unit in fluid communication with channel 35. Channel 35 as well as channel 34 are partitioned subplenums, which extend from first plenum 1. It is noted that the partitioning of plenum 1 into subplenums 34 and 35 takes place substantially in an area of overlap between plenums 1 and 2.

In operation, plenum 14 is bolted in fluid communication with subplenum 35, which derives its air pressure from centrifugal fan 4. Adjustable baffle means 32 can be used to adjust the air flow entering plenum 14 through plenum orifice 31. When adjustable baffle means 32 is opened, air under pressure enters plenum 14 and is exhausted through nozzle 30, having the effect of creating downward pressure upon article 9 as it resides upon moving belt 7. In operating in this fashion, transfer of article 9 from a rolling mode and being propelled by air through slots onto a vacuum-enhanced moving belt is facilitated.

The present invention, as a preferred embodiment, also contemplates the use of a second adjustable baffle means 33 for controlling the amount of air used to propel article 9 along the elevator. As such, the operator is not only able to predetermine the quantity of air flow emanating through nozzle 30 to apply downward pressure upon article 9, but is also able to control the forward thrust upon article 9 in the transition area 15 to again enhance the opportunity of article 9 to seat upon vacuum-enhanced belt 7.

It is contemplated that the air pressure emanating from slot 30 ranges from approximately 0.25 to 6 inches water gauge in the preferred operation of the present device. It is further contemplated that the volume of air emanating from discharge nozzle 30 be in the range of 50 to 350 cubic feet per minute. These values can be "fine tuned" through the use of an optionally-provided regulator depicted in FIGS. 3A and 3B.

As previously noted, baffle 32 can be used to grossly regulate the amount of air emanating from plenum 1 into plenum 14 through orifice 31 and out of nozzle 30. However, finer adjustment of the air flow emanating from nozzle 30 can be made by opening or restricting nozzle 30 by projecting knife edge 36 proximate ledge 38, all contained and made part of nozzle 30. This is accomplished by adjusting screw/bolt assembly 37, which is functionally connected to knife edge 36.

In operation, once the gross adjustment has been made through the opening of baffle 32, the operator need merely visually inspect the article transition between the outer surface of plenum 1 and the vacuum-enhanced moving belt of plenum 2. If the articles seem to resist smooth transfer between the above-recited sections of the elevator, the amount of air emanating from nozzle 30 can be adjusted (increased).

It can be readily visualized that in the practice of the present invention, for the first time, one is able to take advantage of the positive effects of the use of both positive air pressure movement of an article and vacuum-enhanced belt movement of the article in a single elevator. Heretofore, without the use of a transfer mechanism, an elevator combining both air movement and vacuum-enhanced belt movement would have been impossible.

Although details of the invention have been depicted above, it is readily understood that the present invention is to be limited only by the appended claims. For example, the transfer mechanism was shown as being in fluid communication with plenum 1 as a means of employing a single centrifugal fan to supply air for both the article advancing function of the elevator and the article stabilizing function of the transfer device. However, one of ordinary skill in the art could easily envision the use of a separate centrifugal fan and plenum system for supplying air to the transfer nozzle while remaining within the spirit and scope of the present invention. In addition, it is contemplated in the practice of the present invention to use a single centrifugal fan to create not only the vacuum or low pressure area within plenum 2 but also the positive air pressure within plenum 1.

I claim:

1. A device for transporting a plurality of similarly oriented articles closed on at least one end between differing levels, the device comprising:
   A. a first plenum having a perforated upper surface, said perforations being oriented to direct air from inside the plenum in the direction of transport of said plurality of similarly oriented articles;
   B. means for providing air pressure to said first plenum in an amount sufficient to at least transport said plurality of similarly oriented articles from a first entry level to a transfer level;
   C. a second plenum having an air permeable upper surface being vertically oriented with respect to said first plenum and overlapping said first plenum at the transfer level;
   D. belt means adapted to be supported by and moved over the upper surface of said second plenum, said belt means being perforated to enable low pressure established in the second plenum to draw air through said belt means in an amount sufficient to secure said similarly oriented articles thereto;
   E. means for creating low pressure within the interior of said second plenum;
   F. means for moving said belt means to transport said similarly oriented articles from said transfer level to a discharge level;
   G. transfer means located at the overlap of said first and second plenums which possesses a nozzle for directing air against said similarly oriented articles at least when said articles first contact said belt means in an amount to enhance the securing of said articles to said belt.

2. The device of claim 1 wherein the air directed from the nozzle of said transfer means emanates from said first plenum.

3. The device of claim 1 wherein one or more dampers are provided within said first plenum to enable the control of relative air pressure between the perforated upper surface of the first plenum and the nozzle of the transfer means.

4. The device of claim 1 wherein means are provided for regulating the quantity of air emanating from the nozzle of said transfer means.

5. The device of claim 1 wherein said articles comprise cylindrically-shaped cans being closed at one end.

6. The device of claim 5 wherein said cans are received by the upper surface of said first plenum in a substantially horizontally oriented rolling attitude.

7. The device of claim 6 wherein said cans transfer from the upper surface of said first plenum to the belt means at said transfer level in such an orientation that said cans are adhered to said belt means by drawing said vacuum at their closed ends.

8. The device of claim 1 wherein said plurality of similarly oriented articles are transported at a rate of approximately 1 to 2500 articles per minute.

9. The device of claim 1 wherein said transfer means is approximately 6 inches to 6 feet in length measured along the path of travel of said articles.

10. The device of claim 1 wherein said belt is caused to travel at a speed of approximately 200 ft./min. to 800 ft./min.

11. The device of claim 7 wherein said cans are received on said belt means in a substantially horizontal orientation and are discharged from said belt means in a substantially vertical orientation.

* * * * *